W. BUTLER.
Bolt-Trimmer.

No. 218,706. Patented Aug. 19, 1879.

WITNESSES:

INVENTOR,
William Butler,
By Connolly Bros., ATTORNEYS

UNITED STATES PATENT OFFICE.

WILLIAM BUTLER, OF PHILADELPHIA, PENNSYLVANIA.

IMPROVEMENT IN BOLT-TRIMMERS.

Specification forming part of Letters Patent No. 218,706, dated August 19, 1879; application filed February 11, 1879.

*To all whom it may concern:*

Be it known that I, WILLIAM BUTLER, of Philadelphia, in the county of Philadelphia and State of Pennsylvania, have invented certain new and useful Improvements in Bolt-Trimmers; and I do hereby declare the following to be a full, clear, and exact description of the invention, such as will enable others skilled in the art to which it pertains to make and use it, reference being had to the accompanying drawings, which form part of this specification, in which—

Figure 1:
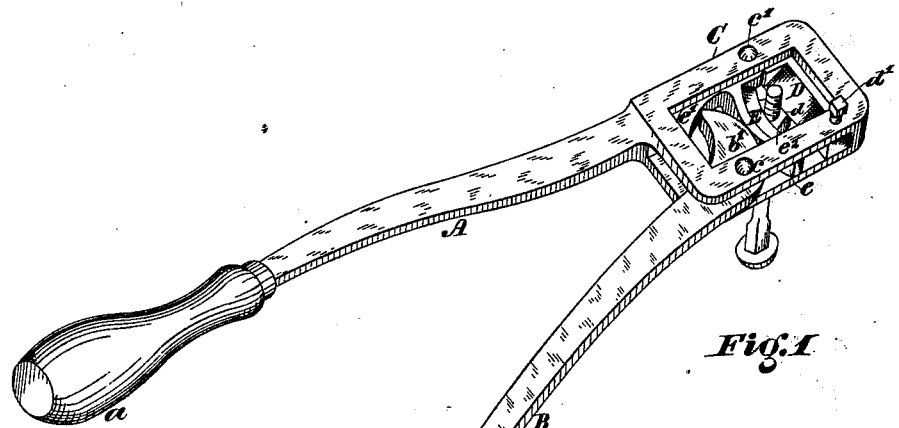
Figure 2:
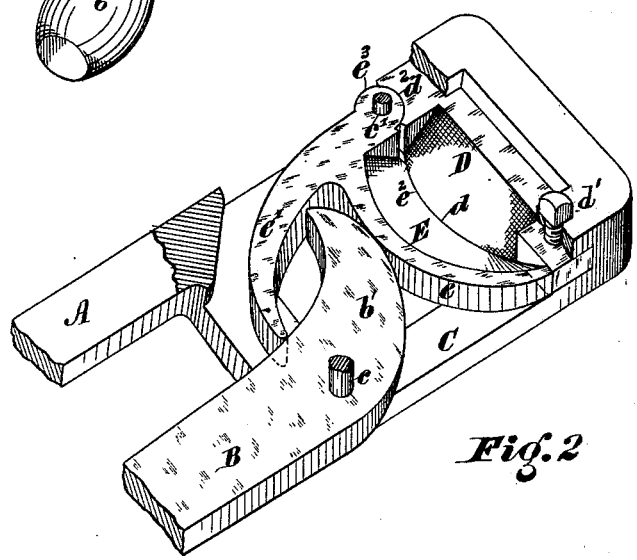

Figure 1 is a perspective of my improvement; and Fig. 2 is an enlarged perspective of the frame of the trimmer, partly in section, to fully illustrate the construction of the cam-jaw, bit, and cutter-bar.

My invention has for its object to furnish a strong, light, and comparatively inexpensive tool for trimming or cutting off the ends of bolts; and my improvements consist in the peculiar construction, combination, and arrangement of parts hereinafter fully set forth.

In the accompanying drawings, A and B represent two bars or jaws, having, respectively, handles $a$ and $b$, by which they are grasped and operated. The bar A terminates in a rectangular open frame, C, in one side of which the other bar, B, is pivoted at $c$.

D is a stationary cutter bar or bit, having a convex edge, $d$, located in the upper or outer part of the frame C, and E is a movable bit, pivoted in said frame at $c'$. The bit E is nearly of a V shape, having two arms, $e$ and $e^1$, the former having a concave cutting-edge, $e^2$, concentric with the edge of the cutter-bar D. Between these two arms of the bit E works the cam-shaped end $b'$ of the bar B.

The operation is substantially as follows: On spreading the handles $a$ and $b$, or drawing them apart, the cam $b'$ comes in contact with the arm $e^1$ of the bit E, turning the latter on its pivot, and moving the edge $e^2$ away from the edge $d$. The tool is now brought down over the projecting end of a bolt, or the bolt is caused to enter between the edges $d$ and $e^2$, the parts then occupying the position shown in Fig. 1. Now, on drawing the handles $a$ and $b$ toward each other, the cam $b'$ will be brought in contact with and caused to move upon the back of the arm $e$, thereby swinging the bit E up toward the cutter-bar D, bringing the edges $d$ and $e^2$ together, and severing the bolt by a shear-cut.

It will be observed that the cutter-bar D is fastened in the frame C by only a single bolt, $d^1$, the apex of the bit E being rounded at $e^3$, and entering a notch or socket, $d^2$, in said bar. The bit thus holds the cutter-bar's adjacent end in position, no matter what the position of the former may be.

When the parts D and E become worn they may be removed and sharpened, or new ones substituted for them.

What I claim as my invention is—

The bar or jaw A, terminating in frame C, having stationary cutter-bar D and swinging bit E, in combination with the bar or jaw B, pivoted to said frame, and formed with a cam, $b'$, said bit being provided with the arm $e^1$, whereby the bar D and bit E are separated by a positive movement and leverage of the jaw B, substantially as shown and set forth.

In testimony that I claim the foregoing I have hereunto set my hand this 3d day of February, 1879.

WILLIAM BUTLER.

Witnesses:
SAML. J. VAN STAVOREN,
CHAS. F. VAN HORN.